US012390869B2

(12) United States Patent
Liu et al.

(10) Patent No.: US 12,390,869 B2
(45) Date of Patent: Aug. 19, 2025

(54) HAND-HELD ELECTRIC TOOL (71) Applicant: TECHTRONIC CORDLESS GP, Anderson, SC (US)

(72) Inventors: Jie Liu, Dongguan (CN); Zhigang Peng, Dongguan (CN); Hua Fan, Dongguan (CN); Wai Chung Lee, Hong Kong (CN); Kar Tat Wong, Hong Kong (CN)

(73) Assignee: TECHTRONIC CORDLESS GP, Anderson, SC (US)

( * ) Notice: Subject to any disclaimer, the term of this patent is extended or adjusted under 35 U.S.C. 154(b) by 234 days.

(21) Appl. No.: 18/133,776

(22) Filed: Apr. 12, 2023

(65) Prior Publication Data
US 2023/0321738 A1 Oct. 12, 2023

(30) Foreign Application Priority Data
Apr. 12, 2022 (CN) .......................... 202210383385.9

(51) Int. Cl.
*B23D 59/00* (2006.01)
*B27G 19/00* (2006.01)

(52) U.S. Cl.
CPC ......... *B23D 59/006* (2013.01); *B27G 19/003* (2013.01)

(58) Field of Classification Search
CPC ........................... B27G 19/003; B23D 59/006
See application file for complete search history.

(56) References Cited

U.S. PATENT DOCUMENTS 2,990,858 A 7/1961 Ledger
4,193,193 A * 3/1980 Holzworth ............. B27G 19/08
30/382

(Continued)

FOREIGN PATENT DOCUMENTS

AU 769254 B2 1/2004
AU 2011221378 A1 9/2011
(Continued)

OTHER PUBLICATIONS

EP Search Report dated Mar. 27, 2023 for corresponding EP Patent Application No. 22194102 (2 pages).
(Continued)

*Primary Examiner* — Sean M Michalski
(74) *Attorney, Agent, or Firm* — Dority & Manning, P.A.

(57) ABSTRACT

The present invention provides a hand-held electric tool comprising a housing and an operating component. The housing has a main body section and a grip section extending from the rear side of the main body section, and the front end of the main body section is provided with a mounting interface. The operating component is mounted at the mounting interface of the housing and protrudes from the housing. A chip removal hole is formed in the bottom wall of the main body section of the housing, and a protective portion that extends downwards at least partially is provided at the bottom end at the position where the main body section joins the grip section. The bottom of a hand-held electric tool of the present invention is substantially closed, except for being provided with a chip removal hole, which allows removal of chips while preventing a user's hand from being inadvertently extended into the housing and contacting a component operating at a high speed. Moreover, chips removed through the chip removal hole are blocked by the protective portion, without reaching the grip section, which (Continued)

offers considerable advantages in terms of safety and hygiene.

15 Claims, 7 Drawing Sheets

(56) References Cited

U.S. PATENT DOCUMENTS

| | | |
|---|---|---|
| 4,807,366 A | 2/1989 | Masato et al. |
| 4,819,335 A | 4/1989 | Alexander |
| 4,841,641 A | 6/1989 | Laidlaw |
| 4,887,357 A | 12/1989 | Alexander |
| 5,491,899 A | 2/1996 | Schliemann et al. |
| 5,522,143 A | 6/1996 | Schliemann et al. |
| 5,685,080 A * | 11/1997 | Amano .................. B27B 17/08 30/DIG. 1 |
| D389,026 S | 1/1998 | Amano et al. |
| D445,657 S * | 7/2001 | Jong ................................ D8/65 |
| 6,532,671 B1 | 3/2003 | Jong |
| 6,564,459 B1 | 5/2003 | Steinbrueck et al. |
| 7,107,689 B2 | 9/2006 | Keeton et al. |
| 7,155,832 B2 | 1/2007 | Warfel et al. |
| D547,630 S * | 7/2007 | Fisher ............................. D8/65 |
| 7,284,333 B2 * | 10/2007 | Lawler ................ B27G 19/003 30/382 |
| 7,287,330 B1 | 10/2007 | Riha |
| D560,456 S * | 1/2008 | Gieske ............................. D8/65 |
| 7,600,323 B2 | 10/2009 | Sugishita |
| D603,672 S * | 11/2009 | Baxter ............................. D8/5 |
| 7,690,407 B2 | 4/2010 | Annala |
| 7,743,513 B1 | 6/2010 | Fisher et al. |
| D631,314 S | 1/2011 | Baxter |
| 8,065,805 B2 | 11/2011 | Stones et al. |
| 8,136,254 B2 | 3/2012 | Gieske et al. |
| 8,286,359 B2 * | 10/2012 | Ashfield ................ B27B 17/02 30/381 |
| 8,365,420 B2 | 2/2013 | Pellenc |
| 8,434,236 B2 | 5/2013 | Pellenc |
| 8,495,819 B2 | 7/2013 | Okouchi |
| 8,595,943 B2 | 12/2013 | Buttery et al. |
| 8,672,162 B2 | 3/2014 | Okouchi |
| 9,132,568 B2 | 9/2015 | Peterson |
| 9,138,912 B2 | 9/2015 | Kapinsky et al. |
| 9,636,840 B2 * | 5/2017 | Saitoh .................... B27B 17/08 |
| 9,669,563 B2 | 6/2017 | Lee |
| 9,676,115 B2 | 6/2017 | Takayanagi et al. |
| 9,713,880 B2 | 7/2017 | Haneda et al. |
| 9,713,881 B2 | 7/2017 | Zimmermann et al. |
| 9,717,185 B2 | 8/2017 | Stones et al. |
| 10,434,682 B2 | 10/2019 | Bonomi |
| 10,537,983 B2 | 1/2020 | Dyer et al. |
| 10,814,518 B2 | 10/2020 | Gerstenberger et al. |
| D906,779 S | 1/2021 | Tinius |
| 10,882,206 B2 | 1/2021 | McRoberts et al. |
| D932,268 S | 10/2021 | Fang |
| D957,225 S | 7/2022 | Song |
| D959,945 S | 8/2022 | Lin |
| D977,932 S | 2/2023 | Paunovic |
| D1,049,811 S * | 11/2024 | Kuang ............................. D8/65 |
| 2004/0098869 A1 | 5/2004 | Ashfield |
| 2006/0230900 A1 | 10/2006 | Bergquisto |
| 2009/0241353 A1 | 10/2009 | Ericson et al. |
| 2011/0005088 A1 | 1/2011 | Pellenc |
| 2011/0162219 A1 * | 7/2011 | Okouchi ................ B27B 17/00 173/217 |
| 2012/0118595 A1 | 5/2012 | Pellenc |
| 2012/0174416 A1 | 7/2012 | Nelson, II |
| 2013/0345003 A1 | 12/2013 | Maag et al. |
| 2014/0047722 A1 | 2/2014 | Onose et al. |
| 2014/0115905 A1 | 5/2014 | Han |
| 2015/0135542 A1 | 5/2015 | Cook |
| 2016/0039110 A1 | 2/2016 | Schiedt et al. |
| 2017/0239835 A1 * | 8/2017 | Ebner ..................... B27B 17/12 |
| 2017/0294819 A1 | 10/2017 | Crosby et al. |
| 2018/0084731 A1 | 3/2018 | Harris |
| 2018/0133818 A1 | 5/2018 | Mang et al. |
| 2018/0193932 A1 | 7/2018 | Gall |
| 2019/0357446 A1 | 11/2019 | McCue et al. |
| 2019/0366580 A1 | 12/2019 | Lu |
| 2020/0223090 A1 | 7/2020 | Osawa et al. |
| 2020/0306847 A1 | 10/2020 | Osawa et al. |
| 2020/0398417 A1 | 12/2020 | Osawa et al. |
| 2021/0050766 A1 | 2/2021 | Lee et al. |
| 2021/0078123 A1 | 3/2021 | Oberhofer et al. |
| 2021/0114249 A1 | 4/2021 | Li |
| 2021/0154879 A1 | 5/2021 | McCue et al. |
| 2021/0162622 A1 * | 6/2021 | Cao ........................ B27B 17/14 |

FOREIGN PATENT DOCUMENTS

| | | |
|---|---|---|
| CA | 1106264 A | 8/1981 |
| CN | 102101084 B | 3/2013 |
| CN | 109877917 A | 6/2019 |
| CN | 211030357 U | 7/2020 |
| CN | 211362619 U | 8/2020 |
| CN | 211362622 U | 8/2020 |
| CN | 212287976 U | 1/2021 |
| CN | 212368051 U | 1/2021 |
| CN | 112339021 A | 2/2021 |
| CN | 213044275 U | 4/2021 |
| CN | 213320571 U | 6/2021 |
| DE | 202005001674 U1 | 4/2005 |
| DE | 202015004337 U1 | 10/2015 |
| DE | 202015106227 U1 | 11/2015 |
| DE | 102019121221 A1 | 2/2021 |
| EP | 1764197 A2 | 3/2007 |
| EP | 2492070 A1 | 8/2012 |
| EP | 4186665 A1 | 5/2023 |
| JP | 2002210705 A | 7/2002 |
| WO | WO2012/144942 A1 | 10/2012 |
| WO | WO2022048532 A1 | 3/2022 |

OTHER PUBLICATIONS

European Search Report Corresponding with Application No. EP23167381 on Aug. 8, 2023 (1 page).

* cited by examiner

HAND-HELD ELECTRIC TOOL

This application claims priority to Chinese Patent Application No. 202210383385.9, filed on Apr. 12, 2022, the disclosure of which is incorporated by reference herein in its entirety.

TECHNICAL FIELD

The present invention relates to the field of small industrial appliances, in particular to a hand-held electric tool.

BACKGROUND ART

When a common hand-held electric tool currently available on the market is used to cut or chip an object, some chips are generated, which are usually brought into the housing and then removed from the housing as its operating components (such as the saw chain and blades) move. Generally, the bottom of the housing is fully open for the removal of chips, and a user's hand can easily come into contact with the high-speed saw chain, blades, or another structure inside the housing through such an open bottom, which poses substantial safety risks. Moreover, after being removed from the housing, chips may, due to inertia, continue to move at a high speed and fall onto the user's hands, adversely affecting the user's health and safety. In another aspect, since the external structure of an existing hand-held electric tool is not well designed, the hand-held electric tool is very stable and easily shakes during operation.

Therefore, it is necessary to provide a hand-held electric tool to at least partially solve the above-mentioned problems.

SUMMARY OF THE INVENTION

An objective of the present invention is to provide a hand-held electric tool, wherein the bottom of the main body of the hand-held electric tool is provided with a bottom wall, and a chip removal hole is provided in the bottom wall, which means that the bottom of the hand-held electric tool is substantially closed, so such a bottom arrangement allows the removal of chips while preventing a user's hand from being inadvertently extended into the housing and contacting a component operating at a high speed. The rear side of the chip removal hole of the hand-held electric tool is provided with a protective portion, so that chips removed through the chip removal hole are blocked by the protective portion, without reaching the grip section, which offers considerable advantages in terms of safety and hygiene.

On the other hand, the present invention provides preferred settings of the dimensions of various components and structures, making the hand-held electric tool safer and more comfortable. A hand-held electric tool of the present invention is further provided with a first rest block located at the top for a user's fingers to rest, and a second rest block located at the bottom for the object to be worked to rest, wherein these rest blocks can improve operational stability, and the first rest block can also prevent the user's fingers from crossing the front end of the housing and contacting an operating component.

According to one aspect of the present invention, a hand-held electric tool is provided, comprising:
  a housing having a main body section and a grip section extending towards the rear side from the main body section, wherein the front end of the main body section is provided with a mounting interface;
  an operating component mounted at the mounting interface of the housing and protruding from the housing, wherein
  a chip removal hole is formed in the bottom wall of the main body section of the housing, and a protective portion that extends downwards at least partially is provided at the bottom end at the position where the main body section joins the grip section.

In one embodiment, the chip removal hole is oriented forwards and downwards, preferably with the inner wall of the housing, which is located behind the chip removal hole, extending forwards and downwards.

In one embodiment, the chip removal hole is oriented backwards and downwards, and the main body section comprises a guide member located near the chip removal hole to guide the removal of chips backwards and downwards from the main body section, wherein, preferably, the guide member comprises a first guide wall and a second guide wall that is located below the first guide wall and has a guide direction different from that of the first guide wall, the second guide wall extending backwards and downwards.

In one embodiment, the operating component comprises a saw chain that rotates on its plane of extension, the first guide wall facing and being shaped to fit a portion of the saw chain.

In one embodiment, the protective portion comprises a downwardly and forwardly extending baffle located at its frontmost portion.

In one embodiment, the protective portion further comprises a protective portion cross member extending backwards from the baffle, defining a space for accommodating a user's hand between the protective portion and the grip section.

In one embodiment, the housing further comprises a battery engagement section located at the rear end of the grip section and extending substantially perpendicular to the grip section, preferably with the protective portion extending to be joined to the lower end of the battery engagement section.

In one embodiment, the width of the baffle is greater than that of the housing, wherein preferably the overall width of the protective portion is greater than the width of the grip section, and preferably the baffle of the protective portion is wider than other parts.

In one embodiment, the grip section extends backwards and downwards from the main body section, preferably with the protective portion cross member being substantially parallel to the direction of extension of the grip section.

In one embodiment, the chip removal hole is adjacent to the front surface of the baffle, wherein preferably the chip removal hole has a length that is ⅛-¼ that of the main body section, preferably the chip removal hole has a width that is ¼-½ that of the main body section, and preferably the chip removal hole is a substantially circular hole or a substantially square hole.

In one embodiment, the operating component comprises a saw chain that rotates on its plane of extension, the saw chain comprising a bottom section, a top section, as well as a front connecting section and a rear connecting section that are connected therebetween, wherein the bottom section of the saw chain moves backwards during the operation.

In one embodiment, the top side of the main body section is provided with a first rest block, which is configured to allow a user's hand to rest against the rear end face of the first rest block, wherein, preferably, the width of the rear end face of the first rest block is ⅕-⅓ that of the main body section, and preferably, the top surface of the first rest block is configured as an L-shaped structure.

In one embodiment, a second rest block is arranged at the frontmost position on the bottom side of the main body section, and the second rest block is configured such that its front end face abuts the object to be worked during use, wherein, preferably, the second rest block extends over the almost complete width of the main body section, and preferably, the length of the second rest block is ⅕-⅓ that of the main body section.

In one embodiment, the main body section comprises a first section and a second section that are adjacent to each other, wherein the direction of extension of the first section forms an angle between 100-160 degrees, preferably between 100-150 degrees, and more preferably between 140-150 degrees with the direction of extension of the second section, the second section being specifically a motor section.

In one embodiment, the first rest block is located at least partially in the first section, preferably the first rest block being located substantially in the first section.

BRIEF DESCRIPTION OF THE DRAWINGS

For a better understanding of the above-described and other objectives, features, advantages and functions of the present invention, reference may be made to the preferred embodiments shown in the drawings. In the drawings, identical reference symbols denote identical components. Those skilled in the art will understand that the drawings are intended to schematically illustrate preferred embodiments of the present invention, without imposing any restrictions on the scope of the present invention, and that the components in the drawings are not drawn to scale.

REFERENCE SYMBOLS

100 Hand-held electric tool
10 Housing
11 Main body section
11*a* Bottom wall of main body section
11*b* Chip removal hole
111 First section of main body section
112 Second section of main body section
113 First housing portion of main body section
114 Second housing portion of main body section
115 Third housing portion of main body section
113*a* Protective wall
113*b* Guide wall
12 Grip section
13 First rest block
131 Rear end face of first rest block
14 Second rest block
141 Front end face of second rest block
15 Guide member
151 First guide wall
152 Second guide wall
16 Battery engagement section
17 Transmission member
20 Operating component
21 Saw chain
211 Bottom section of saw chain
212 Top section of saw chain
213 Front connecting section of saw chain
215 Rear connecting section of saw chain
214 Support plate
22 Protective cover
30 Protective portion
31 Baffle
32 Transition section
33 Protective portion cross member

SPECIFIC EMBODIMENTS

Specific embodiments of the present invention are now described in detail with reference to the drawings. The embodiments described here are merely preferred embodiments according to the present invention; those skilled in the art will be able to think of other ways of implementing the present invention based on these preferred embodiments, and these other ways likewise fall within the scope of the present invention.

Figure 1:
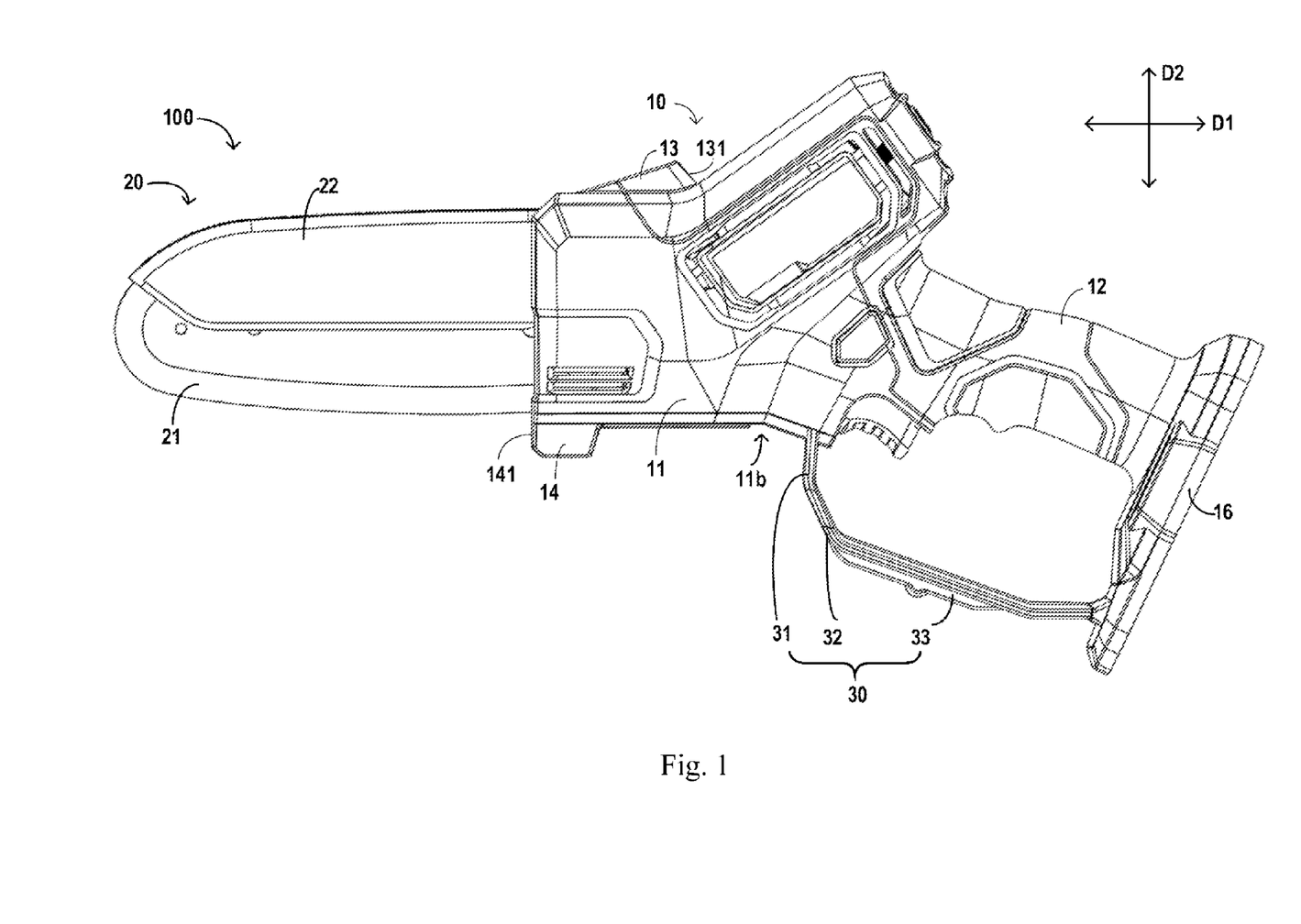
FIG. 1 is a front view of a hand-held electric tool according to a preferred embodiment of the present invention.

FIG. 1-FIG. 6 are preferred embodiments of a hand-held electric tool according to the present invention, which may be, for example, a hand-held trimming device or a hand-held cutting device. First of all, it must be explained that directional and positional terms in the present invention should be understood to mean relative directions and positions, not absolute directions and positions. The directional terms and positional terms used in the present invention are explainable with reference to the exemplary structures shown in FIG. 1-FIG. 6. For example, as used in the present invention, "front side" and "forwards" refer to the direction that extends in direction D1 and, when the user correctly holds the hand-held electric tool, is away from the user (that is, the direction pointing to the left as shown in FIG. 1); "rear side" and "backwards" refer to the direction that extends in direction D1 and, when the user correctly holds the hand-held electric tool, faces the user (that is, the direction pointing to the right as shown in FIG. 1); terms like "top side" and "above" refer to the upward position and direction in direction D2 as shown in FIG. 1; terms like "bottom side" and "below" refer to the downward position and direction in direction D2 as shown in FIG. 1; the width of a component refers to the size of the component in direction D3; and the length of a component refers to the size of the component in direction D1. In addition, the terms "first" and "second" as used in the present invention are only intended to distinguish between names, rather than implying any order of precedence, wherein, for example, the presence of a second rest block does not necessarily mean that a first rest block exists.

Figure 3:
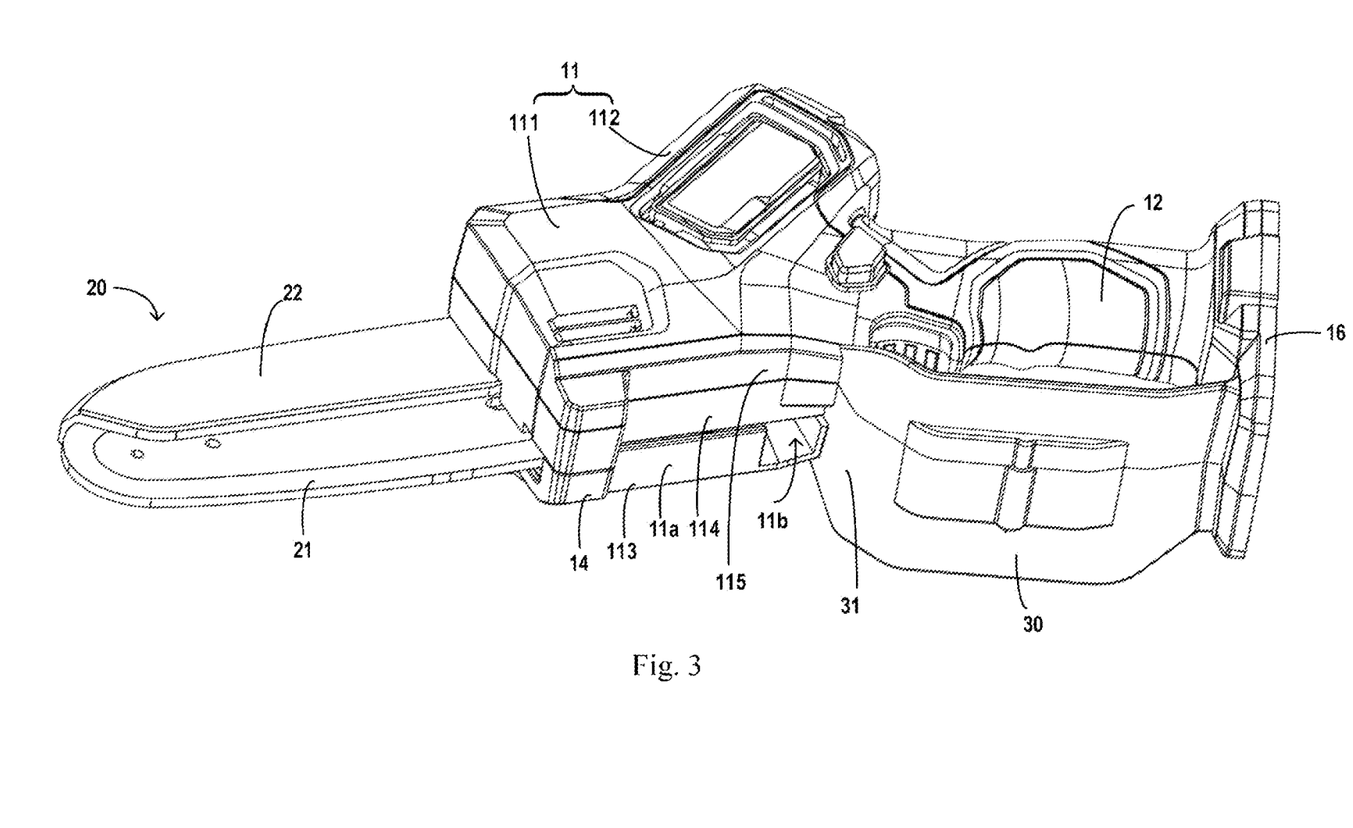
FIG. 3 is a perspective view of the hand-held electric tool shown in FIG. 1 taken from its bottom side.

Referring first to FIG. 1, a hand-held electric tool 100 of the present invention comprises a housing 10 and an operating component 20. The housing 10 and the components located therein constitute the main structure of the hand-held electric tool 100. In some embodiments, the housing 10 may have a main body section 11 and a grip section 12 extending backwards from the main body section 11, as well as a battery engagement section 16 located at the rear end of the grip section 12 and extending perpendicular to the grip section 12. The main body section 11 may further comprise a first section 111 and a second section 112 that are adjacent to each other, wherein the second section 112 is configured to accommodate the motor section 15 of the electric machine, for example. The direction of extension of the first section 111 forms an angle between 100-160 degrees, preferably between 100-150 degrees, and more preferably between 140-150 degrees with the direction of extension of the second section 112. Referring to FIG. 3, the housing of the main body section 11 may comprise a first housing portion 113, a second housing portion 114, and a third housing portion 115 arranged sequentially in a third direction D3.

The front end of the main body section 11 is provided with a mounting interface, and the operating component 20 may be mounted at the mounting interface of the housing 10 and protrude forwards from the housing 10. In some embodiments, the grip section 12 may extend backwards and downwards from the main body section 11, such that an obtuse angle is formed between the direction of extension of the grip section 12 and the direction of extension of the operating component 20. A battery can be slid in a direction of extension parallel to the battery engagement section 16 to the position where it engages the battery engagement section 16.

Figure 2:
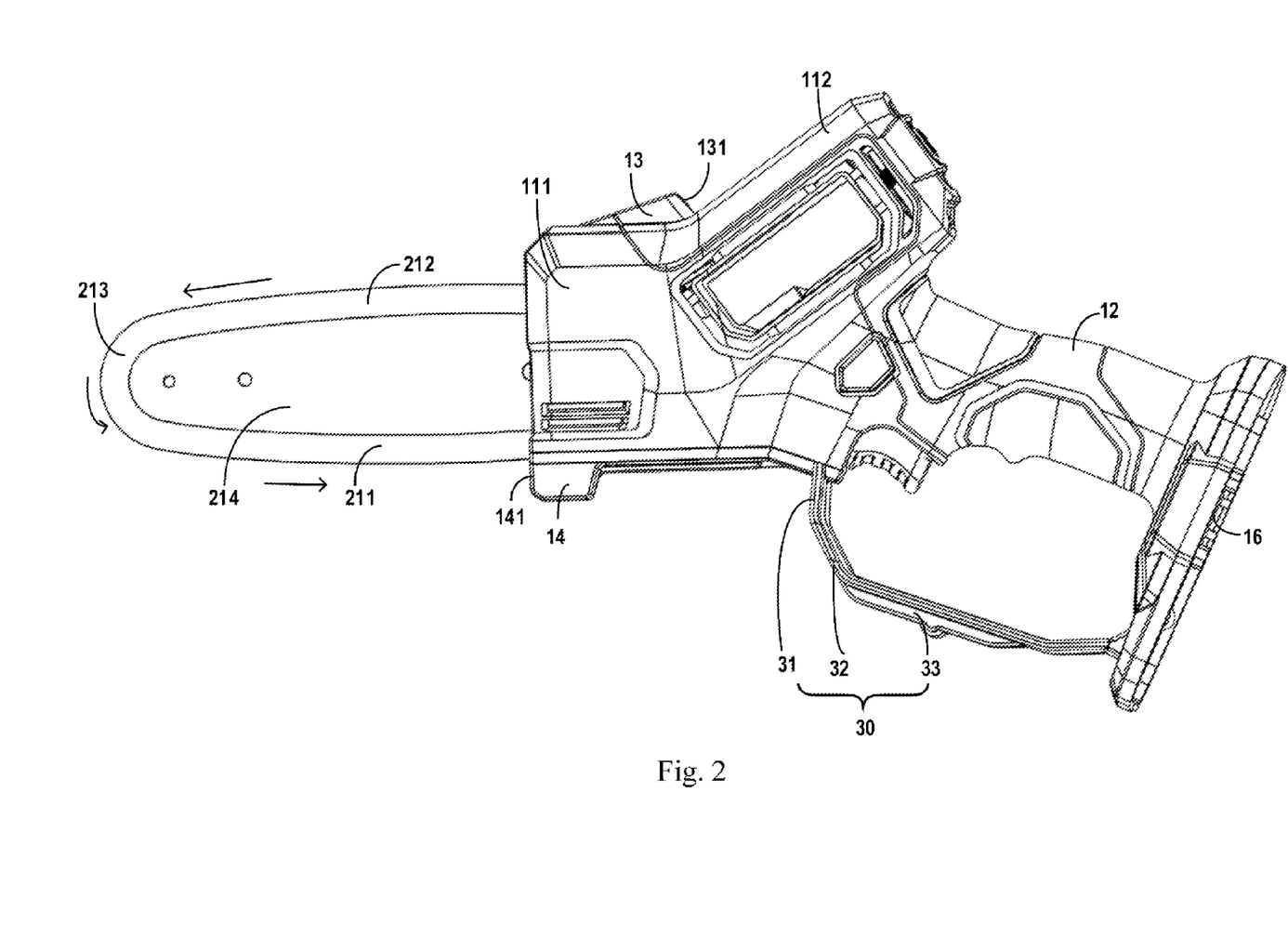
FIG. 2 is a schematic diagram of the hand-held electric tool shown in FIG. 1 after removal of the protective cover of the operating component.

The operating component 20 is used for cutting and trimming objects to be worked, such as woods and branches of trees. Referring to FIG. 2, in some embodiments, the operating component 20 comprises, for example, a saw chain 21 supported by a support plate 214, the saw chain 21 being rotatable around the support plate 214 within a plane defined by the first direction D1 and the second direction D2 to cut an object. Preferably, the top of the saw chain 21 is provided with a protective cover 22, the protective cover 22 being removable from the housing 10 or pivotally openable relative to the housing 10. During the operation, when the saw chain 21 acts on an object to be worked, some chips will be generated and, as the saw chain 21 rotates, will be driven into the housing 10, and a chip removal hole 11*b* for removing chips is formed in the bottom wall 11*a* of the main body section 11 of the housing 10, the chip removal hole 11*b* being shown in detail in FIG. 3-FIG. 4B.

Figure 4A:
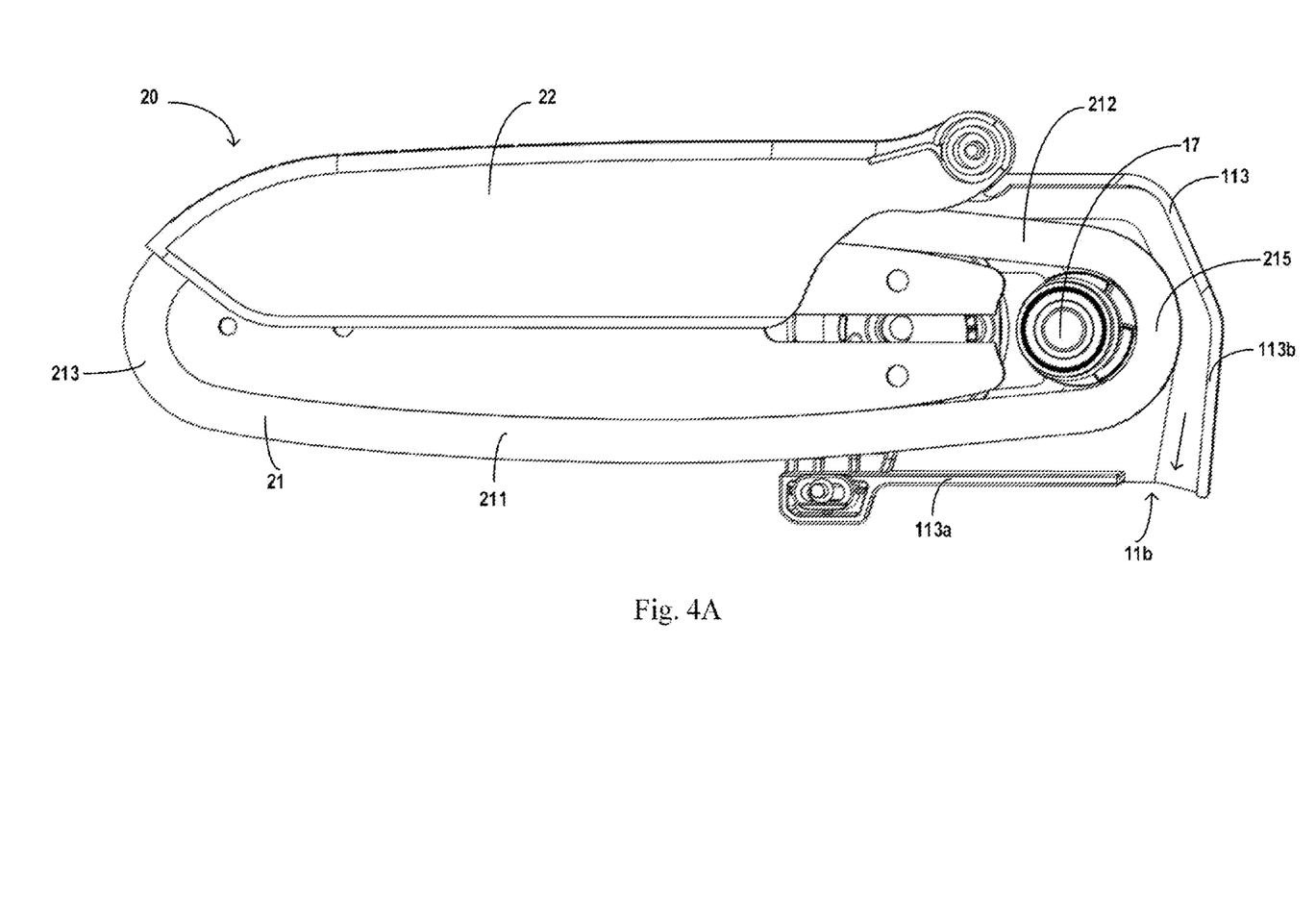
FIG. 4A is a front view of the operating component and the first housing portion of the main body section in FIG. 1, with other portions omitted, to clearly show the chip removal hole.
Figure 4B:
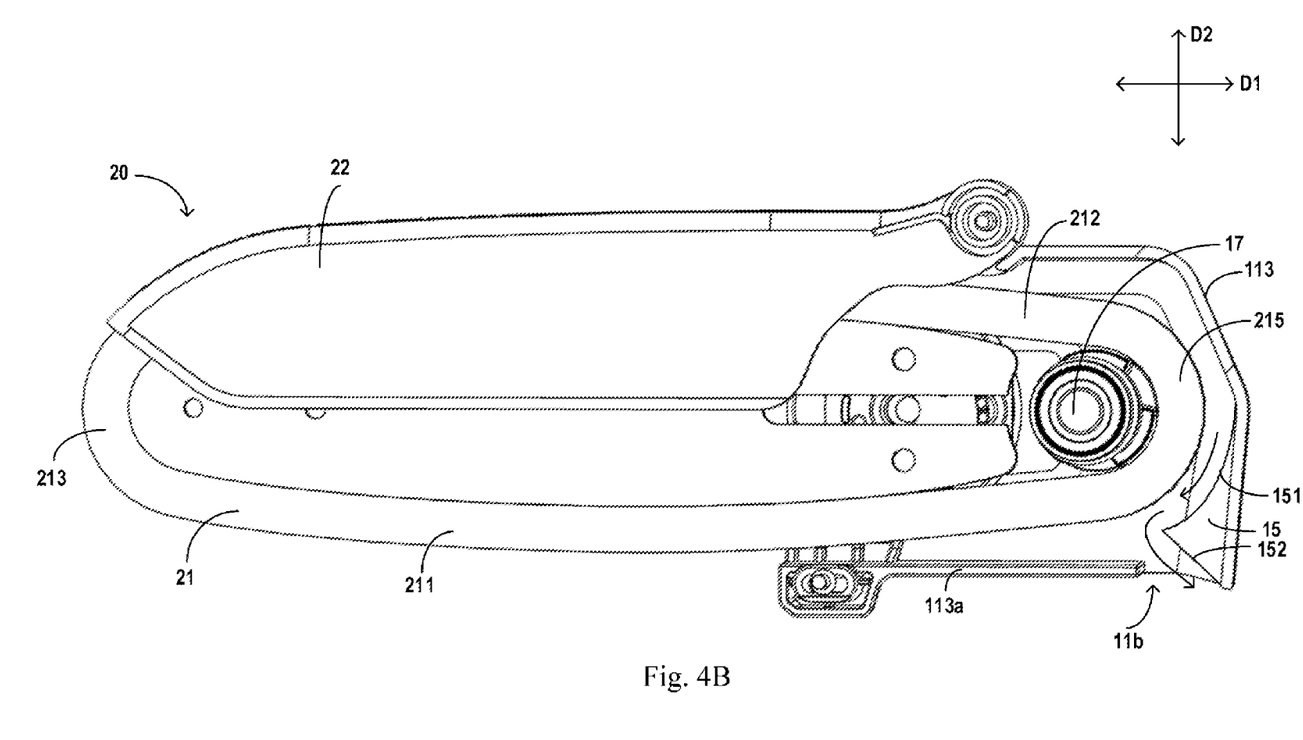
FIG. 4B is an alternative solution for that shown in FIG. 4A, in which a guide member is further provided at the chip removal hole.

Again referring to FIG. 2, in some embodiments, the saw chain 21 comprises a bottom section 211, a top section 212, as well as a front connecting section 213 and a rear connecting section 215 that are connected therebetween (as shown in FIG. 4A and FIG. 4B, the rear connecting section 215 may be located within the housing 10), wherein, during the operation, the bottom section 211 moves backwards and the top section 212 moves forwards. The rear connecting section 215 of the saw chain 21 rotates around a transmission member 17 (see FIG. 4A and FIG. 4B) to be driven by the transmission member 17, the transmission member 17 can be connected to the output shaft of the motor. The chip removal hole 11*b* is positioned just downstream of the movement direction of the bottom section 211 of the saw chain 21 to allow the removal of chips, thus preventing the accumulation of chips in the housing 10.

Referring to FIG. 3, the bottom of the housing 10 is substantially closed, on which only one chip removal hole 11*b* is provided, the chip removal hole 11*b* being preferably located at the rearmost end of the bottom wall 11*a* of the main body section 11. In some embodiments, the bottom walls of the second housing portion 114 and the third housing portion 115 are complete, and only the rear end of the bottom wall of the first housing portion 113 is provided with an opening for the formation of a chip removal hole 11*b*. In some embodiments, the chip removal hole 11*b* may have a small opening area, wherein the length of the chip removal hole 11*b* may be ⅛-¼ that of the main body section 11, for example, and the length of the chip removal hole 11*b* may be ⅕ that of the main body section 11, for example; the width of the chip removal hole 11*b* may be ¼-½ that of the main body section 11, wherein the width of the chip removal hole 11*b* may be ⅓ that of the main body section 11, for example. In some embodiments, the chip removal hole 11*b* has a regular shape, being, for example, a substantially circular hole or, as shown in FIG. 3, a substantially square hole. The substantially closed bottom structure of the hand-held electric tool 100 allows the removal of chips while preventing a user's hand from being inadvertently extended into the housing 10 and contacting the operating component 20 rotating at a high speed. For example, in some embodiments, the rotary speed of the saw chain 21 may be as high as 3-8 m/s, preferably 4-8 m/s and more preferably 6 m/s.

Possible orientations of the chip removal hole are shown in FIG. 4A and FIG. 4B. Referring to FIG. 4A, the direction of removal of chips is indicated by an arrow, which has a forward component and a downward component, so it is clear that the chip removal hole 11*b* is oriented downwards and forwards. Preferably, the first housing portion 113 has a forwardly and downwardly extending inner wall 113*b* located behind the chip removal hole 11*b*, the inner wall 113*b* being usable as a guide wall to guide chips forwards and downwards. The bottom wall 113*a* of the first housing portion 113 forms a protective wall to prevent a user's hand from being extended upwards into the housing.

The structure shown in FIG. 4B is substantially the same as that shown in FIG. 4A, except that a guide member 15 is further provided in FIG. 4B to guide chips backwards and downwards until they are removed through the chip removal hole 11*b*. In FIG. 4B, the direction of removal of chips is also indicated by arrows, with the endmost arrow portion having a backward component and a downward component, so it is clear that the chip removal hole 11*b* is oriented downwards and backwards. Optionally, the guide member 15 comprises a first guide wall 151 and a second guide wall 152 that is located below the first guide wall 151 and has a guide direction different from that of the first guide wall 151, the second guide wall 152 extending backwards and downwards. More preferably, the first guide wall 151 and the rear connecting section 215 of the saw chain 21 face each other and are shaped to fit each other, so that the first guide wall 151 is a curved wall, while the second guide wall 152 may be a straight wall.

The arrangements and orientations of the two chip removal holes shown in FIG. 4A and FIG. 4B are conducive to the centralised removal of chips, particularly suitable for small hand-held electric tools.

To prevent chips removed from the chip removal hole 11*b* from continuing to move due to inertia and falling onto the user's hand, the hand-held electric tool 100 of the present application is provided with a protective portion 30 that extends downwards at least partially behind the chip removal hole 11*b* (that is, at the bottom end at the position where the main body section 11 joins the grip section 12), and the protective portion 30 can separate the chip removal hole 11*b* from the grip section 12 for the user to grasp, so that chips removed through the chip removal hole 11*b* do not contact the user's hand. The protective portion 30 comprises, for example, a baffle 31 directly connected to the rear side of the chip removal hole 11b. Preferably, the baffle 31 may extend downwards and forwards to enhance the effect of chip blockage.

The protective portion 30 may be just a downwardly extending baffle as described above, but in some embodiments, with continued reference to FIG. 1-FIG. 3, the protective portion 30 may extend as a whole towards the battery engagement section 16. It should be noted that the backward extension of the protective portion as a whole does not mean that each portion thereof extends backwards, wherein, for example, the frontmost portion of the protective portion 30, which serves as the baffle 31, may partially extend forwards. The protective portion 30, the grip section 12, and the battery engagement section 16 may jointly define a ring shape that closes on the plane defined by direction D1 and direction D2, and a user's hand can extend into the ring. More specifically, the protective portion 30 further comprises a protective portion cross member 33 that is parallel to the direction of extension of the grip section 12 and a transition section 32 connected between the protective portion cross member 33 and the baffle 31. The protective portion cross member 33 constitutes the main body of the protective portion 30, wherein, for example, the length of the protective portion cross member 33 may be greater than ½ or ⅔ of the overall length of the protective portion. Preferably, both the baffle 31 and the protective portion cross member 33 can have a specific shape or direction of extension (for example, the baffle 31 extends downwards and forwards, and the protective portion cross member 33 is parallel to the direction of extension of the grip section 12), and there may be no limitations on the direction of extension of the transition section 32, as long as the protective portion cross member 33 can be connected to the baffle 31. Setting the protective portion cross member 33 to be parallel to the direction of extension of the grip section 12 can increase the space for accommodating the user's hand, thus bringing greater comfortableness to the user.

Although in the embodiments shown in FIG. 1-FIG. 6, the protective portion extends from the position of engagement between the main body section 11 and the grip section 12 to the bottom end of the battery engagement section 16, in another embodiment not shown, there may be a gap between the protective portion and the battery engagement section 16, which means that the area for accommodating the user's hand may be an unclosed structure. In other words, the protective portion 30, instead of being used to form a closed ring shape, may also open to a certain extent, which means that the protective portion cross member 33 may form a cantilever structure.

Figure 5:
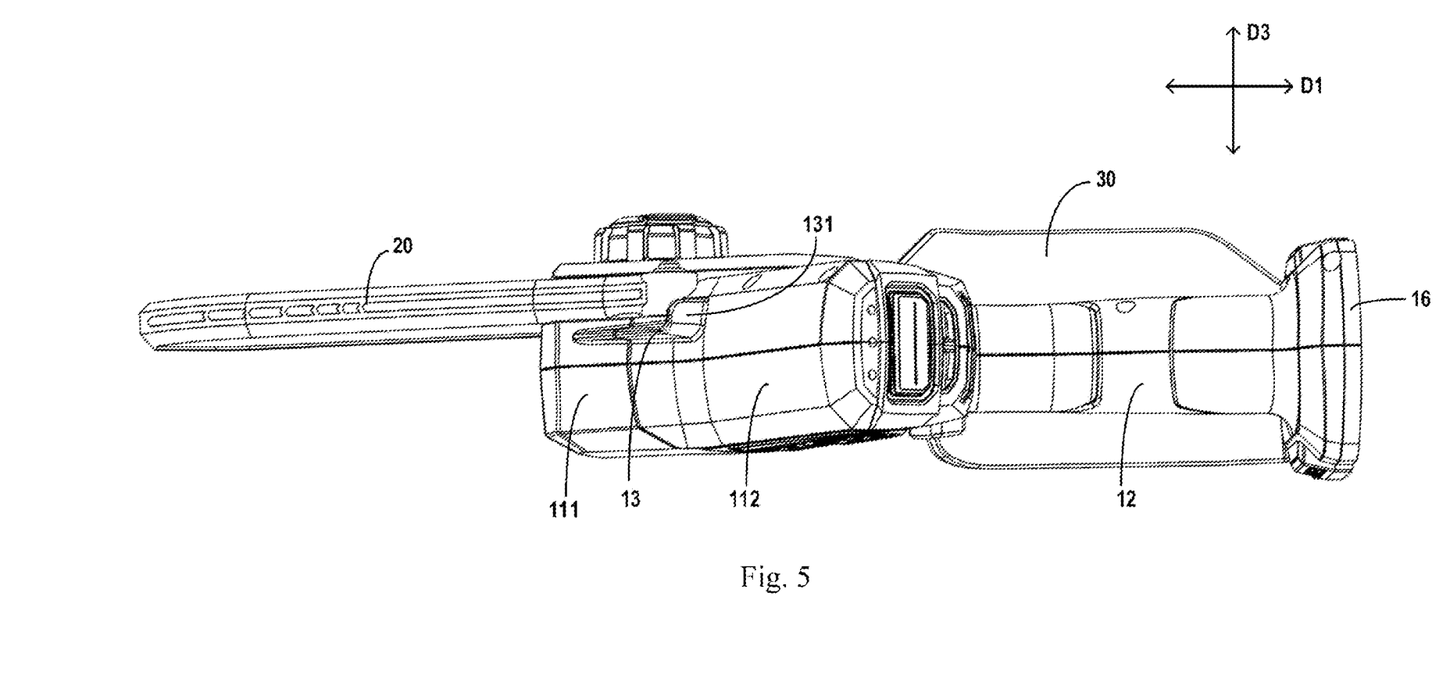
FIG. 5 is a top view of the hand-held electric tool shown in FIG. 1.
Figure 6:
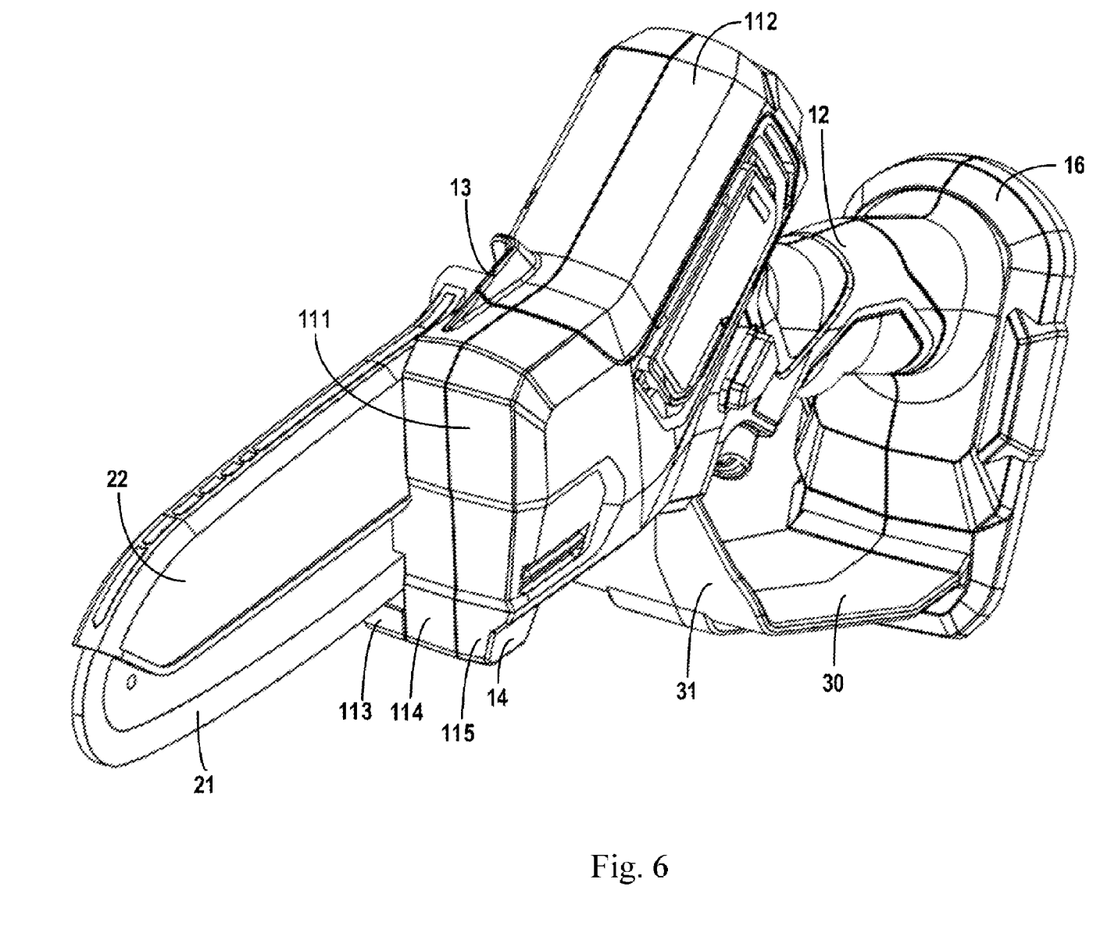
FIG. 6 is a perspective view of the hand-held electric tool shown in FIG. 1 taken from the top side and the front side.

In order to more preferably produce the protection effect of the protective portion 30, the baffle 31 may be set to have a large width, for example, by making the width of the baffle 31 greater than that of the housing 10. More preferably, the protective portion 30 may also be arranged to have a large width as a whole. A comparison between the width of the protective portion 30 and that of the housing is shown in FIG. 5, and as is clear from FIG. 5, the width of the protective portion is greater than that of the housing 10, especially that of the grip section 12, wherein, for example, the width of the protective portion 30 may be 2-3 times that of the grip section 12. With this arrangement, the user's hand is effectively protected within a space defined by the protective portion 30, the grip section 12, and the battery engagement section 16, while chips and other impurities that may be generated during operation are difficult to enter the space. Although not shown in the drawings, preferably the protective portion 30 may have an increased width at the baffle 31, and the width of the baffle 31 may be greater than that of the protective portion cross member 33 and that of the transition section 32.

The housing 10 of the hand-held electric tool 100 is further provided with structures that can improve operational stability and safety. For example, referring to FIG. 1-2 and FIG. 5-6, the top side of the main body section 11 is provided with a first rest block 13, the first rest block 13 being configured to allow the user's hand to rest against the rear end face 131 of the first rest block 13. For example, a user can extend his/her index finger, middle finger, ring finger, and little finger into the annular space defined by the protective portion 30, the grip section 12, and the battery engagement section 16, while resting his/her thumb against the rear end face 131 of the first rest block 13; alternatively, the user can rest his/her index finger against the rear end face of the first rest block 13. Preferably, the first rest block 13 is located at least partially in the first section 111 of the main body section 11, and more preferably, the first rest block 13 is located substantially in the first section 111.

Preferably, since the first rest block 13 only needs to abut and contact the user's fingers, the first rest block 13 does not need to have a large width, wherein, as shown in FIG. 5, for example, the width of the rear end face 131 of the first rest block 13 may be ⅕-⅓ that of the main body section 11. Preferably, the first rest block 13 is configured with an L-shaped top surface, and the portion of the L-shaped structure extending in the third direction D3 serves as a portion that abuts and contacts the user's fingers; the portion of the L-shaped structure extending in the first direction D1 serves as a reinforcing rib. The first rest block 13, besides improving operational stability, prevents the user's fingers from crossing the front end of the housing 10 and contacting an operating component. Moreover, the L-shaped first rest block 13 does not prevent the protective cover 22 from springing open.

Similarly, referring to FIG. 1-3, a second rest block 141 is provided at the frontmost position on the bottom side of the main body section 11, and the second rest block 141 is configured such that its front end face 141 abuts the object to be worked during use. Since an object to be worked is usually large, increasing the area of contact with the object to be worked can improve the stability of the engagement, so preferably the second rest block 141 extends over the almost complete width of the main body section 11, which means that the width of the second rest block 141 is substantially equal to that of the main body section 11. In addition, the length of the second rest block 141 is most preferably ⅕-⅓ that of the main body section 11, wherein it is comprehensible that if the second rest block 141 has a small length, it easily breaks due to insufficiency of stiffness, while if the second rest block 141 is too long, the housing 10 of the hand-held electric tool 100 is heavy.

According to the present invention, the bottom of the main body of a hand-held electric tool is provided with a bottom wall, and a chip removal hole is provided in the bottom wall, which means that the bottom of the hand-held electric tool is substantially closed, so such a bottom arrangement allows the removal of chips while preventing a user's hand from being inadvertently extended into the housing and contacting a component operating at a high speed. The rear side of the chip removal hole of the hand-held electric tool is provided with a protective portion, so that chips removed through the chip removal hole are blocked by the protective portion, without reaching the grip section, which offers considerable advantages in terms of safety and hygiene. On the other hand, the present invention provides preferred settings of the dimensions of various components and structures, making the hand-held electric tool safer and more comfortable. A hand-held electric tool of the present invention is further provided with a first rest block located at the top for a user's fingers to rest, and a second rest block located at the bottom for the object to be worked to rest, wherein these rest blocks can improve operational stability, and the first rest block can also prevent the user's fingers from crossing the front end of the housing and contacting an operating component.

The above description of various embodiments of the present invention is provided to a person skilled in the art for descriptive purposes. The present invention is not intended to be exclusive or limited to a single disclosed embodiment. Based on the above, a person skilled in the art as taught above will understand various substitutes for and variants of the present invention. Thus, although some alternative embodiments have been described specifically, those skilled in the art will understand or develop with relative ease other embodiments. The present invention is intended to include all substitutes for, alterations to, and variants of the present invention described herein, as well as other embodiments falling within the spirit and scope of the present invention described above.

The invention claimed is:

1. Hand-held electric tool, wherein the hand-held electric tool comprises:
   a housing having a main body section and a grip section extending towards the rear side from the main body section, wherein the front end of the main body section is provided with a mounting interface;
   an operating component mounted at the mounting interface of the housing and protruding from the housing, wherein
   a chip removal hole is formed in a bottom wall of the main body section of the housing, and a protective portion that extends downwards at least partially is provided at the bottom end at a position where the main body section joins the grip section.

2. Hand-held electric tool according to claim 1, wherein the chip removal hole is oriented forwards and downwards.

3. Hand-held electric tool according to claim 1, wherein the chip removal hole is oriented backwards and downwards, and the main body section comprises a guide member located near the chip removal hole to guide the removal of chips backwards and downwards from the main body section.

4. Hand-held electric tool according to claim 3, wherein the operating component comprises a saw chain that rotates on its plane of extension, the first guide wall facing and being shaped to fit a portion of the saw chain.

5. Hand-held electric tool according to claim 1, wherein the protective portion comprises a downwardly and forwardly extending baffle located at its frontmost portion.

6. Hand-held electric tool according to claim 5, wherein the protective portion further comprises a protective portion cross member extending backwards from the baffle, defining a space for accommodating a user's hand between the protective portion and the grip section.

7. Hand-held electric tool according to claim 6, wherein the housing further comprises a battery engagement section located at the rear end of the grip section and extending substantially perpendicular to the grip section.

8. Hand-held electric tool according to claim 6, wherein the width of the baffle is greater than that of the housing.

9. Hand-held electric tool according to claim 6, wherein the grip section extends backwards and downwards from the main body section.

10. Hand-held electric tool according to claim 1, wherein the chip removal hole is adjacent to the front surface of the protective portion.

11. Hand-held electric tool according to claim 1, wherein the operating component comprises a saw chain that rotates on its plane of extension, the saw chain comprising a bottom section, a top section, as well as a front connecting section and a rear connecting section that are connected therebetween, wherein the bottom section of the saw chain moves backwards during the operation.

12. Hand-held electric tool according to claim 1, wherein the top side of the main body section is provided with a first rest block, which is configured to allow a user's hand to rest against a rear end face of the first rest block.

13. Hand-held electric tool according to claim 1, wherein a second rest block is arranged at the frontmost position on the bottom side of the main body section, and the second rest block is configured such that its front end face abuts an object to be worked during use.

14. Hand-held electric tool according to claim 1, wherein the main body section comprises a first section and a second section that are adjacent to each other, wherein the direction of extension of the first section forms an angle between 100-160 degrees.

15. Hand-held electric tool according to claim 14, wherein the first rest block is located at least partially in the first section.

* * * * *